United States Patent [19]
Neumann

[11] Patent Number: 6,043,621
[45] Date of Patent: Mar. 28, 2000

[54] PRODUCTION POSITIONING SYSTEM

[75] Inventor: Karl-Erik Neumann, Gräddö, Sweden

[73] Assignee: Neos Robotics AB, Taby, Sweden

[21] Appl. No.: 09/125,358
[22] PCT Filed: Feb. 17, 1997
[86] PCT No.: PCT/SE97/00259
§ 371 Date: Sep. 9, 1998
§ 102(e) Date: Sep. 9, 1998
[87] PCT Pub. No.: WO97/30826
PCT Pub. Date: Aug. 28, 1997

[30] Foreign Application Priority Data

Sep. 20, 1996 [SE] Sweden .................................. 9600622

[51] Int. Cl.$^7$ ...................................................... B25J 9/18
[52] U.S. Cl. ............................... 318/568.11; 318/568.13; 318/568.15; 318/568.19; 318/573; 318/568.1; 701/9; 701/15; 701/19
[58] Field of Search .......................... 318/568.11, 568.13, 318/568.15, 568.19, 573, 568.1; 364/474.05; 901/9, 15, 19

[56] References Cited

U.S. PATENT DOCUMENTS 4,788,482  11/1988  Tachibana et al. .
5,257,203  10/1993  Riley et al. ........................ 364/474.05
5,428,280  6/1995   Schmidt et al. .................... 318/568.11

FOREIGN PATENT DOCUMENTS 0151417  8/1985   European Pat. Off. .
0202206  11/1986  European Pat. Off. .

*Primary Examiner*—Karen Masih
*Attorney, Agent, or Firm*—Ostrolenk, Faber, Gerb & Soffen, LLP

[57] ABSTRACT

A positioning method for a production system for positioning the location of a positioning head (2 12, 27) in relation to a work object, comprising a positioning body (1, 11), e.g. a robot or a machine tool, a positioning control unit (3) for the positioning body (1, 11) and a control data system (4) for the positioning control unit (3), wherein the control data system (4) communicates with a three-dimensional localisation measuring system (6) comprising at least one recording device (7) which determines and adjusts the location of the positioning head (2, 12, 27) in space and a positioning device for a production system for positioning the location of a positioning head (2, 12, 27) in relation to a work object, comprising a positioning body (1, 11), e.g. a robot or a machine tool, a positioning control unit (3) for the positioning body (1, 11) and a control data system (4) for the positioning control unit (3), wherein the control data system (4) is arranged to communicate with a three-dimensional localisation measuring system (6) comprising at least one recording device (7) for determining and adjusting the location of the positioning head (2, 12, 27) in space.

11 Claims, 2 Drawing Sheets

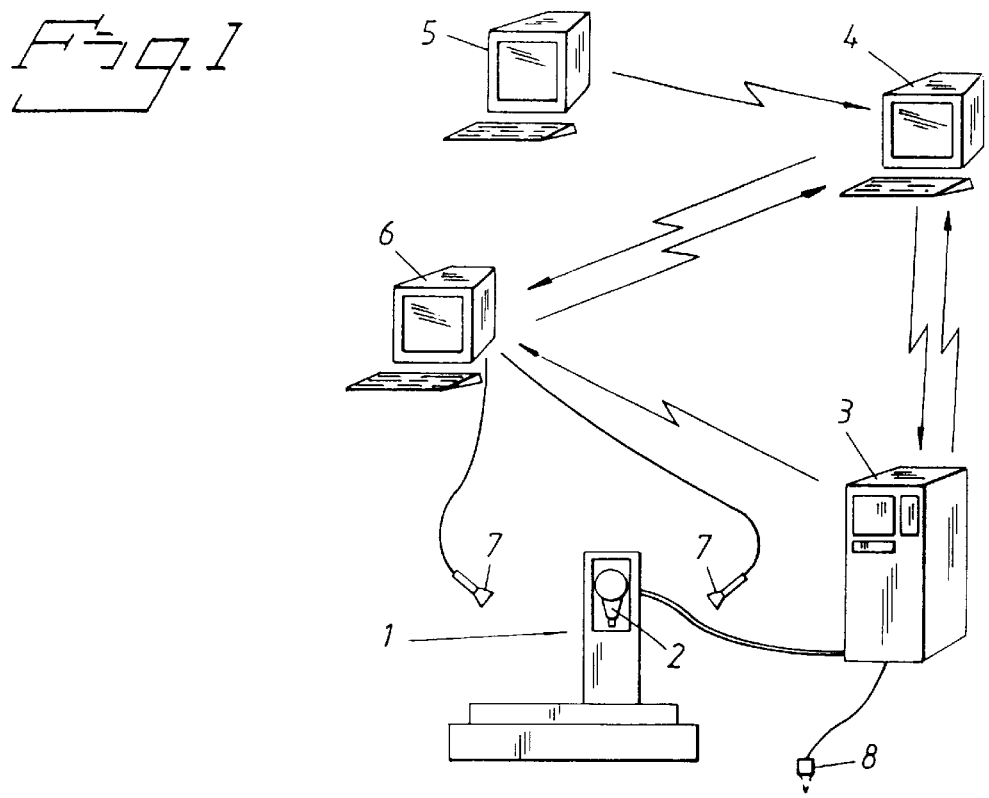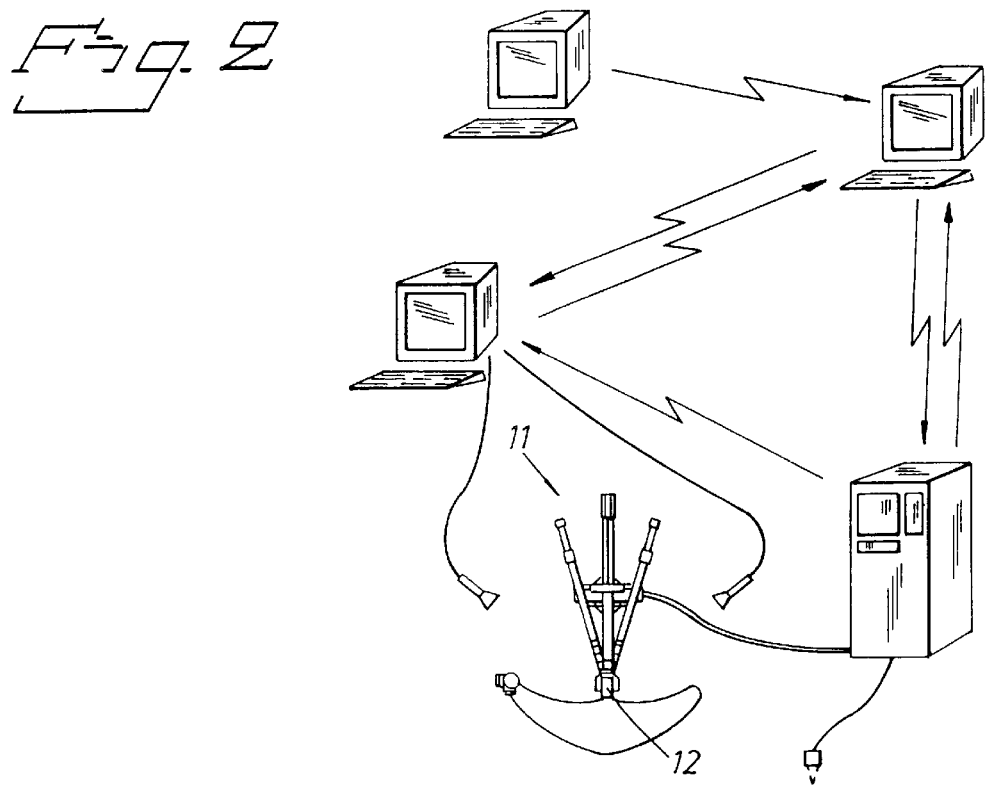

PRODUCTION POSITIONING SYSTEM

TECHNICAL FIELD

The present invention relates to controlling production systems such as industrial robot applications for the workshop industry, for measuring systems, for surgical applications, etc. The invention also relates to controlling applications for machine tools.

More particularly the invention relates to electro-optical measuring systems in combination with control of said applications.

BACKGROUND ART

Most of the individual components used for the present positioning method and positioning device are already known but have not previously been combined in the present manner.

Previously known positioning systems for industrial robots, for instance, are controlled in a similar manner to numerically controlled machine tools, i.e. a positioning control unit receives input data values from a control data system, whereupon the control unit transmits control data concerning positions in three dimensions, speed of rotation and other motion to the positioning member with its positioning head.

This control occurs completely independently of the position of a work object. All movements and positions of the positioning head presuppose a work object with a specific location and with specific dimensions. The securing of the work piece and the location of all parts of the work piece thus determine the tolerances achieved for the work operation. Adjustment must be made, for instance, for temperature variations, wear in bearings and other factors having a negative influence on the location initially determined between the work object and the positioning head. This is a considerable drawback in existing systems.

OBJECT OF THE INVENTION

The object of the invention is to control robots or other systems such as those mentioned above, using a device and a method that does not have the described drawbacks of existing systems, for various tasks with electro-optical systems such as 3D-vision systems, laser follower systems, interferometer systems, etc. A particular feature of the present invention is the control of a positioning head in relation to a work object.

The control is achieved by means of a fundamental localisation measuring system as a part of the invention, which enables determination of the space coordinates for target points with extremely high accuracy and which can calculate the spatial location of other mechanical elements connected to a rigid body provided with target points.

A control data system in the present invention can determine displacements between the actual position of a positioning head and its set location in order to update the control program and can also control the positioning head as required in order to compensate for such displacements.

Recording devices are arranged in order to determine the relative location between the positioning head and the work object, which recording devices may, for example, use photogrammetry and/or 3-D-vision technology in order to calibrate the location of the positioning head.

Another object of the invention is to control a robot of the type defined in Swedish patent application No. 8502327-3 in accordance with the method, and using the device revealed by the present invention.

SUMMARY OF THE INVENTION

The invention shows a method and a device for a production system for positioning the location of a positioning head in relation to a work object, comprising a positioning body, e.g. a robot or a machine tool, a positioning control unit for the positioning body, and a control data system for the positioning control unit, wherein the control data system communicates with a three-dimensional localisation measuring system comprising at least one recording device which determines and adjusts the location of the positioning head in space.

The invention also shows a method and a device according to the above wherein the recording device can also simultaneously record and determine the location of the positioning head and the location of the work object in space.

BRIEF DESCRIPTION OF THE DRAWINGS

The invention will now be described in more detail with reference to the accompanying drawings in which FIG. 1 shows a production positioning system according to the present invention, FIG. 2 shows a production positioning system according to the present invention intended for a robot.

DESCRIPTION OF THE INVENTION

Figure 3:
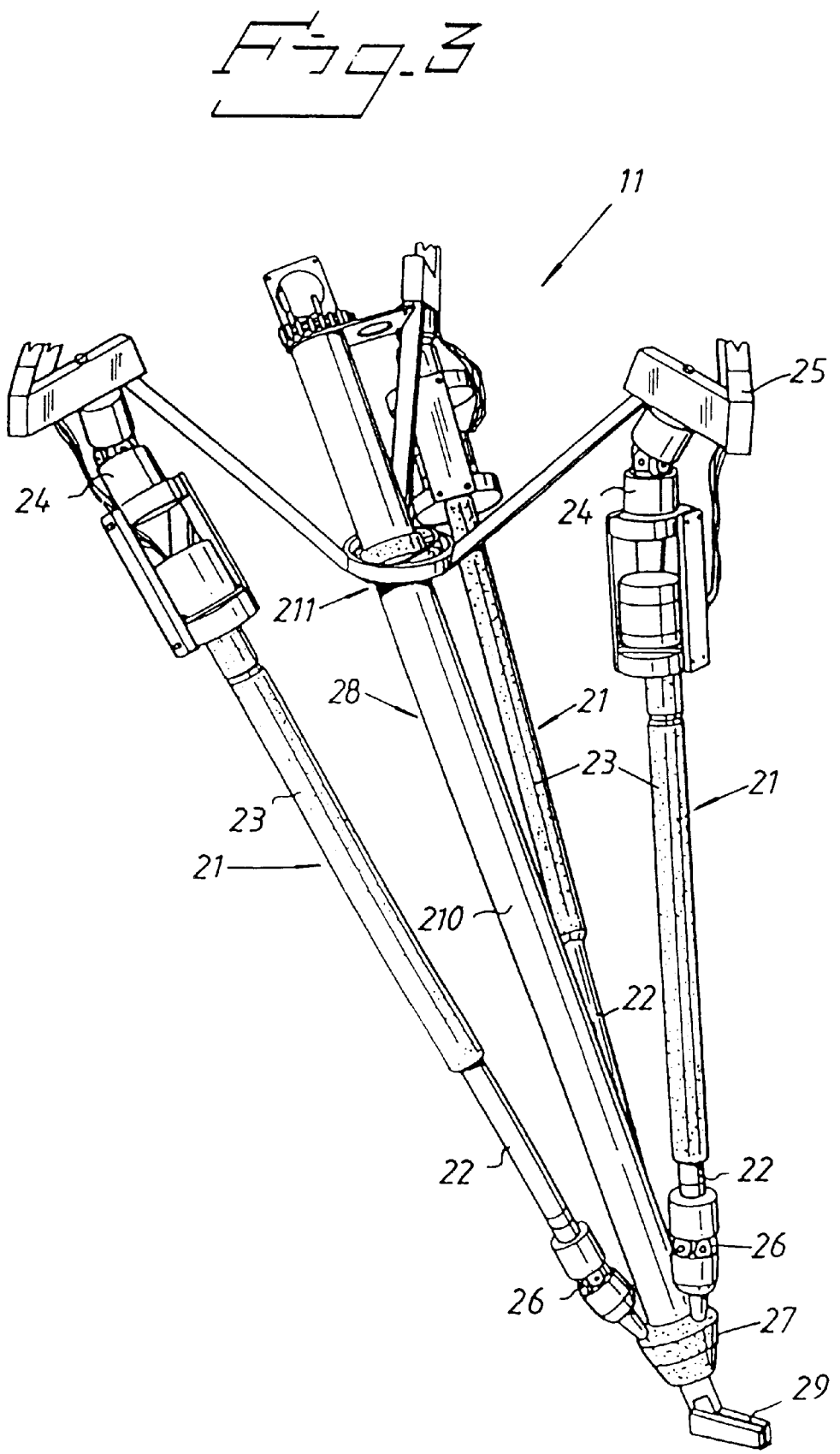
FIG. 3 shows a perspective view of a robot according to FIG. 2.

The positioning device comprises a positioning body 1 provided with a positioning head 2, said body and head being arranged to be controlled repeatedly by a positioning control unit 3 to an optional location in a given work volume. The positioning device also comprises a control data system 4 for communication with the positioning control unit 3. Two-way communication occurs between the control data system 4 and the positioning control unit 3, as indicated in FIG. 1 by two-directional communication arrows.

The positioning body 1, positioning head 2, positioning control unit 3 and control data system 4 constitute in known manner a conventional NC machine or a conventional industrial robot.

The positioning device according to the embodiment of the invention shown in FIG. 1 is also provided with a CAD system 5 which can directly supply the control data system 4 with control data. The control data system 4 can receive control data as input data in numerous other ways than through the CAD system shown here.

A three-dimensional localisation measuring system is connected to the control data system 4 for two-way communication, by which is meant that the system is capable of recording measured points in the recording device and then, by processing the data recorded, to determine the space coordinates of the points. The localisation measuring system is used for its ability to record and determine the position of a measured point in space. The measuring system requires target devices placed on the work object and/or on or at a fixed point in the vicinity of the positioning head 2, that can be accurately measured. The target devices may be of any type whatsoever where the position can be determined by an electro-optical device. The target devices may, for example, be reflecting target surfaces, light diodes, prisms, tool apertures, spheres, etc. With the aid of these target devices the localisation measuring system can record and calculate space coordinates for the location of the target devices in a given work volume in order to be able to transmit this information on to the control data system 4 which in turn communicates with the positioning control unit 3 for control of the positioning head 2.

One or more recording devices 7 is/are connected to the localisation measuring system 6 for positional determination of the space coordinates of the target devices. These recording devices 7 may consist of electro-optical devices which are directly connected to the localisation measuring system for further calculation of the space coordinates. The recording devices 7 thus record the location of the target devices at certain predetermined time intervals to enable said further calculation. The localisation measuring system 6 or the control data system 4 can also calculate the difference between two consecutive recording and positional determination occasions and, with the aid of the positioning control unit 3, adjust the positioning head 2 for this difference. This means that any alteration in the location of the work object, e.g. due to temperature, in relation to the location of the positioning head 2 is adjusted by the positioning device in real time, i.e. while a work operation is in progress.

In the embodiment shown in FIG. 1 an object identifier 8 is connected to the positioning control unit 3 in order to directly trace the surface of the work object before the positioning head 2 arrives at this position, to adjust the positioning head 2 directly via the positioning control unit 3 for any deviations in the location of the surface. The object identifier 8 is thus a supplementary adjustment means in the system.

The localisation measuring system 6 is thus an electro-optical system for determining the relative location of the positioning head 2 in relation to a work piece or some other reference coordinate system.

The positioning device also constitutes a control system which provides the positioning body and its positioning head with adjustments for its path and/or which directly calculates updated positions based on requested locations and observed locations.

The positioning method according to the present invention can be described in the following steps.

Step 1: Target devices are secured to a work object and/or a component which retains the work object in a fixed relative spatial location.

Step 2: The space coordinates from these target devices are determined by the use of some form of recording device. This device may consist of the same electro-optical device as described above or some other measuring device such as a coordinate measuring machine, theodolite, laser tracer, etc.

Step 3: The target devices are secured to the bodies to be positioned and/or to adapters having a fixed relationship to the body to be positioned. For a drilling operation, for instance, the target devices can be secured on the drill spindle or on adapters having a fixed relationship to the spindle holder.

Step 4: The relationship between the target devices on the bodies, e.g. the end of a drill spindle, or an adapter to be positioned is determined either by an external measuring device or by using the electro-optical system described above with the aid of special routines Step 5: An electro-optical device, e.g. a 3D vision system as in the present implementation, uses the target devices secured in accordance with steps 1 and 3 to determine the spatial location of the positioning head 2 in some coordinate system. Other devices are, however, possible. This coordinate system may be a coordinate system for a work cell, a coordinate system to a fixture, a coordinate system to an object, i.e. the coordinate system to the work object in relation to which the positioning system is to be placed, or some other coordinate system.

Step 6:

Procedure 1: Step 5 is performed in a plurality of locations, and adjustments in the form of a mean difference are calculated between locations of the positioning head 2, i.e. the locations the robot "thinks" it is in, and the measured locations. The adjustments are used to control the positioning head 2 in the work volume defined through these locations but not limited by them to adjust the spatial locations. For this purpose the robot and/or machine control program can be updated and the adjustment values can be sent to the robot and/or machine.

Procedure 2: The positioning head is controlled to its exact location by using a feedback loop in which an electro-optical system as described above effects measurements in real time in order to control the positioning head 2.

A recording, a positional determination and an adjustment are thus performed, i.e. a coordinate determination followed by an adjustment of the location of the positioning head 2 and of the work object in space.

The localisation measuring system 6 described above may be a multi-headed interferometer system which is placed in a fixed location and which positions the production head or, as previously described, the positioning head 2.

A specific embodiment of the present invention is shown in FIG. 2 where the positioning body consists of a robot 11 of the type described in Swedish patent application No. 8502327-3 mentioned in the introduction. Otherwise the positioning device and positioning method are identical to those described above. The robot 11 shown in FIG. 2, with its robot positioning head 12, in combination with the present invention constitutes a robot control system with high precision.

The robot 11, see FIG. 3, used as positioning body in FIG. 2 comprises three actuators 21 each of which is in the form of a piston 22 which is displaced in a cylinder 23. The piston 22 is displaced inside the cylinder 23 by conventional drive means, not shown, which may be hydraulic or pneumatic or may consist of a screw and nut mechanism or of hydraulic fluid. Each cylinder end is secured via a joint 24 in a fixed stand or frame 25. The joint 24, enabling the cylinder 23 and piston 22 to oscillate in all directions in relation to the frame 25, is shown here as a cardan joint but may consist of any suitable type of universal joint. Each piston 22 is connected via a similar joint 26 to a robot positioning head 27. The actuators 21 are arranged along the side edges of an imagined triangular pyramid and, by displacing the pistons 22 in respective cylinders 23, the robot positioning head 27 is set in the desired location, since the effective length of the actuator 21 unequivocally determines the location of the robot positioning head 27. The robot includes the above-mentioned positioning control unit 3 which emits signals to the actuators 21 which cause the robot positioning head to move to the desired location.

An arm 28 consisting of a sleeve 210 and a shaft, not shown, journalled in the sleeve 210 extends symmetrically from the robot positioning head 27 between the actuators 21. The sleeve 210 is rigidly joined to the robot positioning head 27 and comprises two bearings arranged one at each end of the sleeve, the shaft being pivotably journalled therein. A universal joint 211 is secured to the frame 25 in an area situated along the symmetry axis of the imagined pyramid. The universal joint 211 has a central opening, the cross section of which is somewhat larger than the outer diameter of the sleeve 210. The sleeve 210 extends through the central opening of the joint and can be displaced in axial direction in relation to the frame 25 and joint 24, at the same time as it can be set at an optional angle in relation to the frame 25, the sleeve 210 thus being controlled radially and being secured against turning in the joint 24. The sleeve 210 is sufficiently long for it always to be in the central opening of the universal joint 211 within the total range of movement of the robot positioning head 27.

The sleeve 210 is provided with a pivot motor, not shown, the turning movements of which, via suitable transmission, provide the shaft with desired turning movement.

The shaft end protruding out through the robot positioning head 27 supports a suitable manipulation device which may consist of a motor-operated gripping device 29. The gripping movements of the gripping device may be controlled with the aid of operating rods running axially and rotatably inside the sleeve 210 and extending out over the other end of the sleeve 210 and connected to suitable operating means.

In FIG. 3 the arm 28 between the actuators 21 consists of a shaft and sleeve unit. However, it may also consist of only a shaft journalled in the universal joint 211 and in the robot positioning head 27. The number of actuators may be more than the three shown in the drawings. Nor do they need to be symmetrically arranged around the arm 28. The shaft may also be arranged displaceable in the sleeve 210.

What is claimed is:

1. A positioning device for a production system for positioning the location of a positioning head in relation to a work object, comprising: a positioning body, a positioning control unit for the positioning body, a control data system for the positioning control unit, a three-dimensional localisation measuring system arranged to communicate with the control data system and comprising at least one recording device for determining and adjusting the location of the positioning head in space, the recording device being arranged to record and determine the spatial location of the positioning head in relation to the work object with target devices whose locations can be accurately measured, arranged with respect to the work object and the positioning head.

2. A positioning device as claimed in claim 1, characterized in that the recording device comprises an electro-optical recording device.

3. A positioning device as claimed in claim 2, characterized in that the recording device comprises a multi-headed interferometer system.

4. A positioning device as claimed in claim 2, characterized in that one or more electro-optical recording devices are arranged in the vicinity of the positioning body to enable the localisation measuring system to record the location of the positioning body and the work object in space through triangulation.

5. A positioning device as claimed in claim 1, characterized in that an object identifier is connected to the positioning control unit.

6. A positioning device as claimed in claim 1, characterized in that the recording device is arranged to simultaneously record the location of the positioning head and of the work object in space.

7. A positioning device as claimed in claim 1, wherein the target devices are on the work object and the positioning head.

8. A positioning device as claimed in claim 1, wherein at least one of the target devices is on an object having a fixed and stable relationship to the work object.

9. A positioning device as claimed in claim 1, wherein at least one of the target devices is on an object having a known relationship to the positioning head.

10. A positioning device as claimed in claim 2, wherein the electro-optical recording device is a 3D vision system.

11. A positioning device as claimed in claim 2, wherein the electro-optical recording device is a laser tracker.

* * * * *